United States Patent
Dongaonkar et al.

(10) Patent No.: US 12,535,972 B2
(45) Date of Patent: Jan. 27, 2026

(54) AVOIDING PARTITION COLLISIONS IN STOCHASTIC ASSOCIATIVE MEMORY FOR DATA STORED ACROSS MULTIPLE PARTITIONS

(71) Applicant: Intel Corporation, Santa Clara, CA (US)

(72) Inventors: Sourabh Dongaonkar, Portland, OR (US); Jawad B. Khan, Portland, OR (US); Chetan Chauhan, Folsom, CA (US); Dipanjan Sengupta, Hillsboro, OR (US); Mariano Tepper, Portland, OR (US); Theodore Willke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 17/358,222

(22) Filed: Jun. 25, 2021

(65) Prior Publication Data
US 2021/0318805 A1  Oct. 14, 2021

(51) Int. Cl.
*G06F 3/06* (2006.01)
*G06F 18/22* (2023.01)

(52) U.S. Cl.
CPC .......... *G06F 3/0688* (2013.01); *G06F 3/0611* (2013.01); *G06F 3/0644* (2013.01); *G06F 3/0659* (2013.01); *G06F 3/0679* (2013.01); *G06F 18/22* (2023.01)

(58) Field of Classification Search
CPC ...... G06F 3/0688; G06F 18/22; G06F 3/0611; G06F 3/0644; G06F 3/0659; G06F 3/0679

USPC ......................................................... 711/154
See application file for complete search history.

(56) References Cited

U.S. PATENT DOCUMENTS

| | | | |
|---|---|---|---|
| 10,726,177 B2* | 7/2020 | Boesch | G06N 20/10 |
| 11,868,440 B1* | 1/2024 | Patel | G06F 17/18 |
| 2015/0016172 A1 | 1/2015 | Loh et al. | |
| 2019/0146717 A1* | 5/2019 | Khan | G06F 12/0646 |
| | | | 711/154 |
| 2019/0220202 A1* | 7/2019 | Khan | G06F 3/0659 |
| 2019/0220230 A1* | 7/2019 | Khan | G06F 12/0207 |
| 2019/0325638 A1* | 10/2019 | Lucas | G06T 7/55 |
| 2019/0325980 A1 | 10/2019 | Nelson et al. | |

(Continued)

FOREIGN PATENT DOCUMENTS

KR  1020180079168 A  7/2018

OTHER PUBLICATIONS

International Search Report and Written Opinion for PCT Patent Application No. PCT/US22/19747, Mailed Jun. 17, 2022, 10 pages.

*Primary Examiner* — Gautam Sain
(74) *Attorney, Agent, or Firm* — Compass IP Law PC

(57) ABSTRACT

Binary sparse encoding of data can be used to reduce an amount of data read from the stochastic associative memory while processing a query. Read performance of the stochastic associated memory is optimized to enhance the query throughput by modifying access patterns to reduce the time to read the stochastic associated memory. Read performance of the stochastic associative memory can be further improved through the use of cluster aware sharding and replication for parallelized similarity search. Clusters are partitioned across multiple Dual In-line Memory Modules (DIMMs), each DIMM including stochastic associative memory, to achieve maximum latency advantage.

14 Claims, 13 Drawing Sheets

(56) References Cited

U.S. PATENT DOCUMENTS

| | | |
|---|---|---|
| 2020/0264874 A1 | 8/2020 | Tepper et al. |
| 2020/0265045 A1 | 8/2020 | Tepper et al. |
| 2020/0265098 A1 | 8/2020 | Tepper et al. |
| 2020/0266929 A1 | 8/2020 | Wu et al. |
| 2020/0301825 A1 | 9/2020 | Chauhan et al. |
| 2020/0364228 A1 | 11/2020 | Akerib |
| 2021/0011910 A1 | 1/2021 | Ilan et al. |
| 2021/0191871 A1* | 6/2021 | Ke ................... G06F 12/0875 |

* cited by examiner

| 0 | 1 | 2 | 3 | 4 | 5 | 6 | 7 |
|---|---|---|---|---|---|---|---|
| A0 | A1 | A2 | B0 | B1 | B2 | B3 | C0 |
| C1 | C2 | C3 | C4 | D0 | D1 | E0 | E1 |
| E2 | E3 | E4 | E5 | F0 | F1 | G0 | G1 |
| G2 | G3 | H0 | H1 | H2 | H3 | H4 | I0 |
| I1 | I2 | I3 | J0 | J1 | J2 | K0 | K1 |

FIG. 5

(12) United States Patent
US 12,535,972 B2

AVOIDING PARTITION COLLISIONS IN STOCHASTIC ASSOCIATIVE MEMORY FOR DATA STORED ACROSS MULTIPLE PARTITIONS

FIELD

This disclosure relates to stochastic associative memory and in particular to avoiding partition collisions in a stochastic associative memory.

BACKGROUND

An object recognition system for an artificial intelligence application may analyze thousands of images of objects stored in a memory so that it can learn to find visual patterns in an image to identify an object. The volume of data used in large-scale similarity searches is an extremely challenging problem that is both compute and memory intensive.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 5 is a representation of clustered data, also referred to as clusters (integers) (A-K) stored in eight partitions labeled 0-7 in the memory 100.

Figure 1:
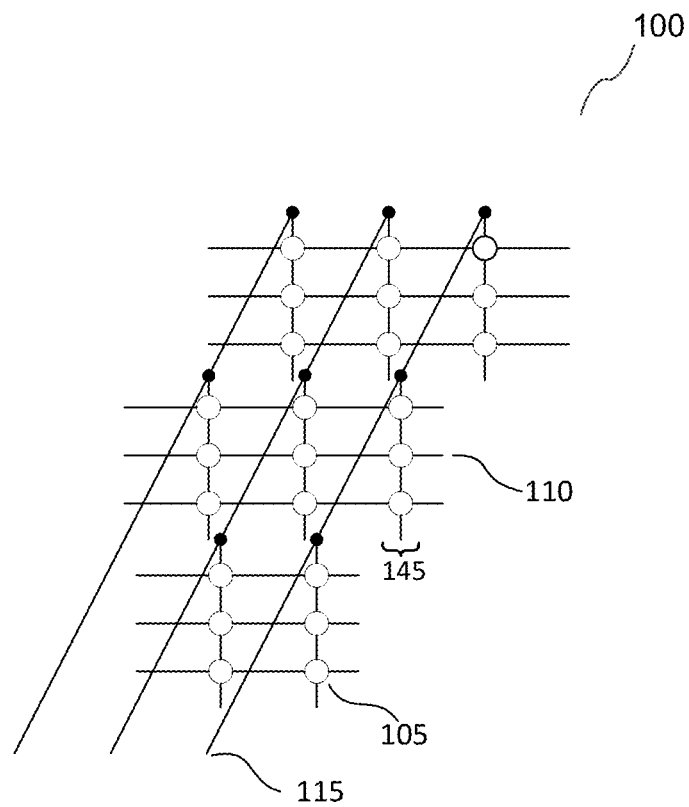
FIG. 1 is an example of a stochastic associative memory comprising a cross-point memory array that includes a plurality of memory cells.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A stochastic associative search can be performed using a binary search key on a stochastic associative memory. Stochastic associative memory is a memory that allows both row-wise reads and column-wise reads with similar read latency. Stochastic Associative Search is a highly efficient and fast way of searching through a very large database of records (order of billions) and finding similar records to a given query record (key).

Binary sparse encoding of data can be used to reduce an amount of data read from the stochastic associative memory while processing a query. Read performance of the stochastic associated memory is optimized to enhance a query throughput by modifying access patterns to reduce the time to read the stochastic associated memory. Read operations are scheduled based on two dimensions (rows and columns) in the stochastic associative memory. The stochastic associative memory can be read by row or by column.

A scheduler in a memory based Compute Accelerator schedules read operations in the memory across multiple queries, and utilizes read patterns unique to similarity search queries that results in improving mean query latency (time to obtain results of a query) by a factor of two and tail latency (99.9% Quality of Service (QoS)) by a factor of four.

Read performance of the stochastic associative memory can be improved through the use of cluster aware sharding and replication for parallelized similarity search. Clusters are partitioned across multiple Dual In-line Memory Modules (DIMMs), each DIMM including stochastic associative memory, to achieve maximum read latency advantage to obtain the results of the query. The use of cluster-aware sharding can achieve up to 8 times throughput improvement.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is an example of a stochastic associative memory comprising a cross-point memory array 100 that includes a plurality of memory cells 105. The cross-point memory array 100 is a byte-addressable, write-in-place non-volatile memory. A non-volatile memory (NVM) device is a type of memory whose state is determinate even if power is interrupted to the device.

In an embodiment, each memory cell 105 includes a material with a crystalline or an amorphous atomic configuration that may have different electrical resistances. A voltage applied to the memory cell 105 results in a different current dependent on whether the material is in a crystalline or an amorphous state, and the magnitude of the resulting current may be used to determine the logic state stored by memory cell 105.

Cross-point memory array 100 may be a three dimensional cross-point memory (3D cross-point memory) array that includes a plurality of levels of two-dimensional (2D) memory arrays formed on top of one another and separated by an electrically insulating material. In the embodiment shown in FIG. 1, cross-point memory array 100 includes three levels; however, the number of levels is not limited to three. The electrically insulating material may be thermally insulating and may contain multiple sublayers to increase the thermal resistance between each level. Each level may be aligned or positioned so that memory cells 105 may be approximately aligned with one another across each level, forming a memory cell stack 145.

Each row of memory cells 105 is connected to a word line 110, and each column of memory cells 105 is connected to a bit line 115 with a memory cell 105 located at the intersection of a word line 110 and a bit line 115. In an embodiment, word lines 110 and bit lines 115 may be substantially perpendicular to one another to create an array.

The memory cells 105 can function in a two-terminal architecture with a particular word line 110 and bit line 115 serving as the electrodes for the memory cells 105. Each memory cell 105 can be addressed individually allowing data to be written and read on a per-bit basis. Word lines 110 and bit lines 115 may be made of conductive materials, such as metals (for example, copper, aluminum, gold, tungsten, titanium), metal alloys, carbon, or other conductive materials, alloys, or compounds.

In operation, a memory cell 105 of cross-point memory array 100 can be written by applying a voltage, across the memory cell 105 via a selected word line 110 and bit line 115. A memory cell 105 of the cross-point memory array 100 can be read by sensing current on a bit line 115 corresponding to the respective memory cell 105 responsive to a particular voltage applied to the selected word line 110 to which the respective memory cell is coupled.

The magnitude of the current sensed is dependent on the electrical resistance of the memory cell 105 and may be used to differentiate between the electrically resistive states of the phase change material. In some cases, sensing may depend on a threshold voltage $V^{th}$, a voltage at which point a current begins to flow.

The state of the memory cell 105 may be a low resistance crystalline state or a high resistance amorphous state, the state is used to represent whether the memory cell stores a logic (binary) '1' (a bit is "set") or logic (binary) '0'(a bit is "clear"). In an embodiment, the low resistance state represents a logic '0' and the high resistance state represents a logic '1'.

Figure 2:
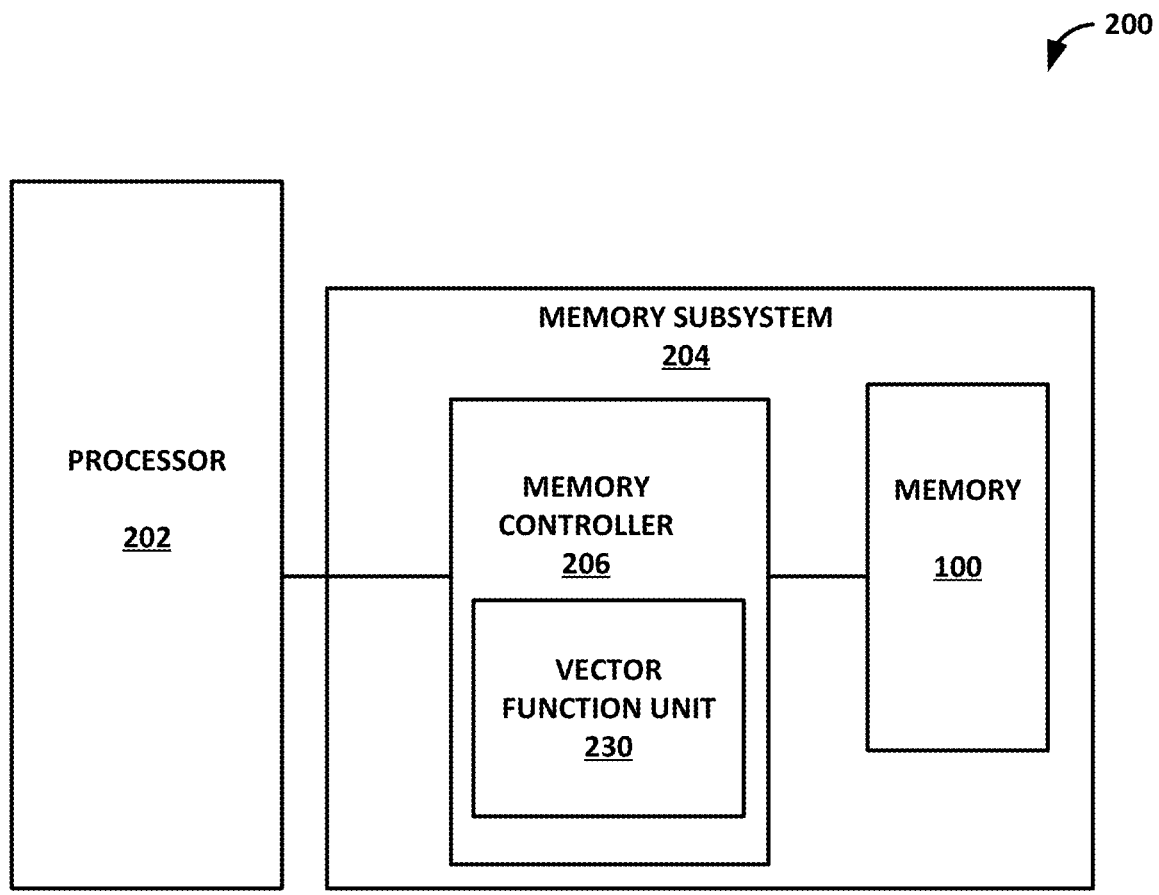
FIG. 2 is a block diagram of a compute device that includes the stochastic associative memory comprising a cross-point memory array shown in FIG. 1.

FIG. 2 is a block diagram of a compute device 200 that includes the stochastic associative memory comprising the cross-point memory array 100 shown in FIG. 1. The compute device 200 includes a processor 202 and a memory subsystem 204. The memory subsystem 204 includes a memory controller 206 and the cross-point memory array 100.

The processor 202 can be embodied as any device or circuitry (e.g., a multi-core processor(s), a microcontroller, or other processor or processing/controlling circuit) capable of performing operations described herein, such as executing an application, for example, an artificial intelligence related application that utilizes stochastic associative searches. In some embodiments, the processor 202 may be embodied as, include, or be coupled to a field-programmable gate array (FPGA), an application specific integrated circuit (ASIC), a system-on-a-chip (SoC), reconfigurable hardware or hardware circuitry, or other specialized hardware to facilitate performance of the functions described herein.

The memory controller 206 can read individual bits stored in columns in the cross-point memory array 100 for use in performing similarity searches, also referred to as "stochastic associative searches" (SAS). As such, the cross-point memory array 100 operates as a "stochastic associative memory", that is, enables the efficient performance of stochastic associative searches. The memory controller 206 can access multiple cells in parallel within a given partition in the cross-point memory array 100.

The memory controller 206 can include a vector function unit (VFU) 230. The VFU 230 can be embodied as any device or circuitry, for example, dedicated circuitry, reconfigurable circuitry, an application specific integrated circuit (ASIC), or a field programmable gate array (FPGA) capable of offloading vector-based tasks from the processor 202 by performing vector-based operations in hardware (circuitry).

The cross-point memory array 100 can be logically partitioned into a plurality of partitions with each partition having a plurality of tiles. Each tile can include one or more cells 105. In an embodiment, each tile has 128 cells (bits).

Figure 3:
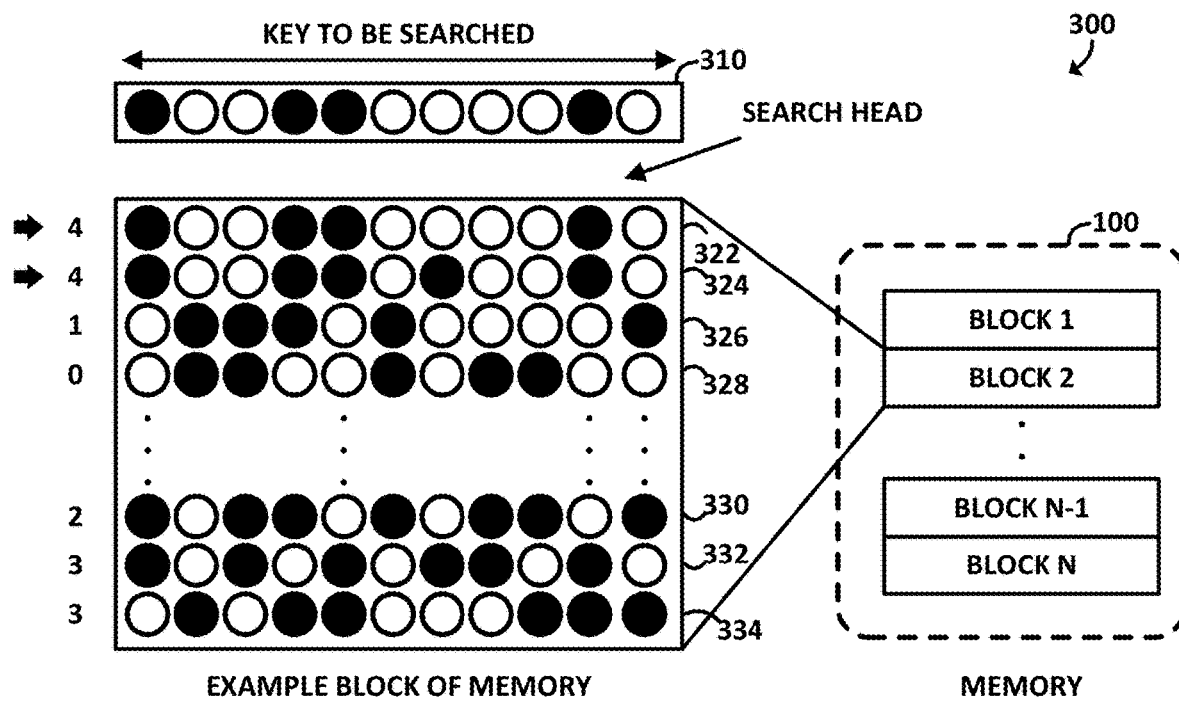
FIG. 3 illustrates a stochastic associative search (SAS) performed using a binary search key in the memory of FIGS. 1-2.

FIG. 3 illustrates a stochastic associative search (SAS) performed using a binary search key in the memory of FIGS. 1-2. The compute device 200 can perform a stochastic associative search 300, which is a highly efficient and fast way of searching through a very large database of records (order of billions) in binary format and finding similar records to a given query record (key). Given that the cross-point memory array 100 allows both row-wise reads and column-wise reads with similar read latency, the cross-point memory array 100 is particularly suited to enabling efficient stochastic associative searches. To utilize the characteristics of the cross-point memory array 100 to perform efficient (e.g., accelerated, using less power and time than would otherwise be consumed) stochastic associative searches, the compute device 200 writes database elements (e.g., records, vectors, rows, etc.) to the cross point memory array 100 in binary format (ones and zeros) as hash codes (sequences of values produced by a hashing function), that are sparse (have more zeros (clear bits) than ones (set bits)). The ones (set bits) encode the information and are used to search for matches.

Subsequently, in performing a search, individual binary values of the search key 310 are compared to the corresponding binary values in the database elements (vectors) 322, 324, 326, 328, 330, 332, 334 stored in the blocks of the cross point memory array 100. The compute device 200 determines the number of matching binary values between the search key 310 and each database element (vector), which is representative of a Hamming distance between the search key 310 and each database element (vector). The database elements (vectors) having the greatest number of matches (e.g., lowest Hamming distance) are the most similar results (the result set) for the stochastic associative search 300.

The compute device 200 can aggregate set bits in the plurality of vertical bit vectors on a row-wise basis to calculate similarity scores for a plurality of rows and can determine if any rows store data matching the search key 310. In the example shown in FIG. 3, database element 322 and database element 324 have four matches, database element 332 and database element 334 have three matches, database element 330 has two matches, database element 328 has one match and database element 328 has no matches with the key to be searched 310.

A database of vectors is stored in the cross-point memory array 100 using row write operations. In response to a stochastic associative search request from an application, the processor 202 formats the query using the same hash encoding as the database of vectors.

In an embodiment of the compute device 200 in which the VFU 230 is not included in the memory controller 206, the processor 202 sends a block column read requests to the memory controller 206 to read the columns corresponding to set bits (bits having a value of one) in the search key 310. The processor 202 subsequently ranks and sorts the top matching rows (vectors) based on the number of set bits matching for the column data that is read from the cross point memory array 100. The processor 202 subsequently identifies the top (greatest number of set bits matching) N similar rows for the application that requested the search results.

In an embodiment in which the VFU 230 is included in the memory controller 206, the processor 202 can send an instruction to the memory controller 206 to perform a macro operation (for example, a Top N similarity search query request) to return top N results based on a given search key 310. Subsequently, the memory controller 206 sends block column read requests to the memory 100 to read the columns corresponding to the set bits in the search key 310. The VFU 230 in the memory controller 206 subsequently ranks and sorts the top N matching rows (vectors) based on the number of set bits matching the column data that was read, and the memory controller 206 subsequently sends, to the processor 202, data indicative of the top N matching rows (vectors) as the search results.

Figure 4:
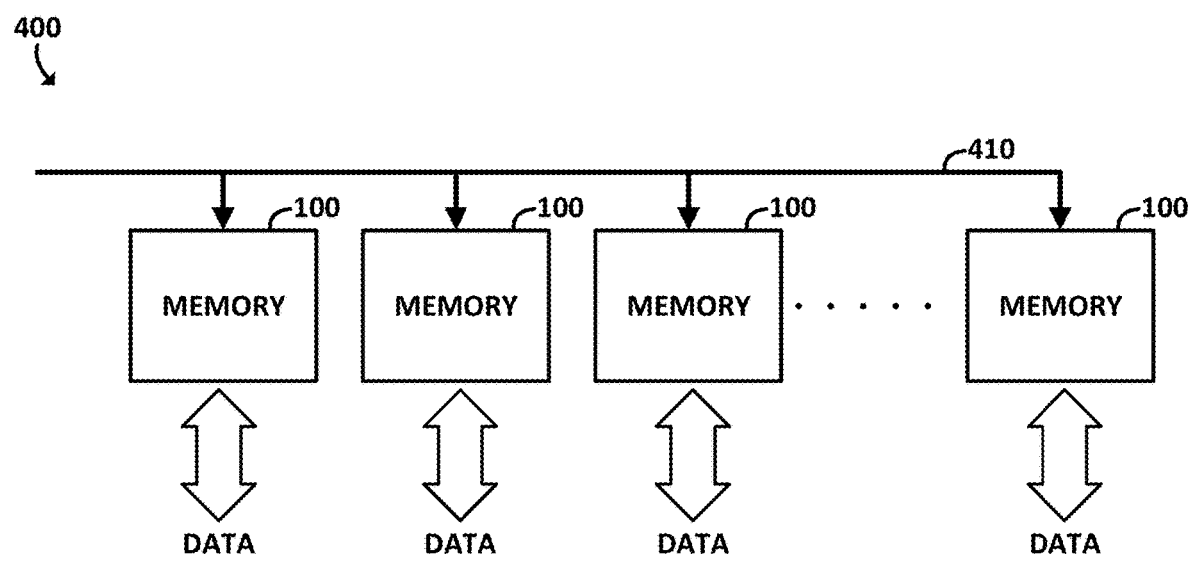
FIG. 4 is a block diagram of a memory module that includes a plurality of the stochastic associative memory comprising the cross-point memory array shown in FIG. 1.

FIG. 4 is a block diagram of a memory module 400 that includes a plurality of the stochastic associative memory comprising a cross-point memory array 100 shown in FIG. 1. The memory module 400 can be a Dual In-line Memory Module (DIMM). Multiple dies of the cross-point memory array 100 on the memory module 400 are connected to a shared command/address bus 410. As such, in operation, data stored in the cross-point memory array 100 on the memory module 400 is read in parallel from all of the dies of the cross point memory array 100 connected to the shared command/address bus 410. Data may be stored in the cross-point memory array 100 in a configuration to allow reading of the same column in each of the dies of the cross-point memory array 100.

The database elements are stored in the cross point memory array 100 as binary bit vectors using row write operations. For a given stochastic associative search, the compute device 200 formats a search query using a hash encoding that matches the hash encoding used to produce the binary format of the database elements in the database.

The dataset (clustered data) stored in the memory 100 is split into clusters with each cluster having a plurality of data points. Each cluster can have 1000 datapoints. The query first finds a subset of the plurality of clusters that are the closest matches as discussed in conjunction with the example in FIG. 3. For example, there can be 20 closest matches with each match having 1000 datapoints. These 20 closest matches can be searched to find the match as discussed in conjunction with FIG. 5-FIG. 9.

FIG. 5 is a representation of clustered data, also referred to as clusters (integers) (A-K) stored in eight partitions labeled 0-7 in the memory 100. A cluster (clustered data) may also be referred to as a chunk of data (data chunks). As shown in FIG. 5, four bits of integer B, labeled B0-B3 are stored in partitions 3-6, with bit B0 stored in partition 3, bit B1 stored in partition 4, bit B2 stored in partition 5 and bit B3 stored in partition 6. In the example shown, clusters B(B0-B3), C(C0-C4), D(D0, D1), F(F0, F1) and H(H0-H4) are read for a query. This requires multiple reads to the same partition, for example, to read B0, C4 and H1 from partition 3.

A delay time which can be referred to as a Partition Busy Time is required prior to a subsequent column-wise read to the same partition. The Partition Busy Time can be 20 times longer than the time to perform one read from a partition. The delay time is not required prior to a subsequent column-wise read from another partition. Thus, the maximum read throughput for the memory is obtained when a subsequent column-wise read command is issued to a different partition.

However, issuing a subsequent read to a different partition is difficult for searching clustered data stored in the memory because each query requires reading several clusters which are stored across multiple partitions. The time to process the query shown in FIG. 5 is dependent the order of the reading of the clusters B(B0-B3), C(C0-C4), D(D0, D1), F(F0, F1) and H(H0-H4).

Figure 6:
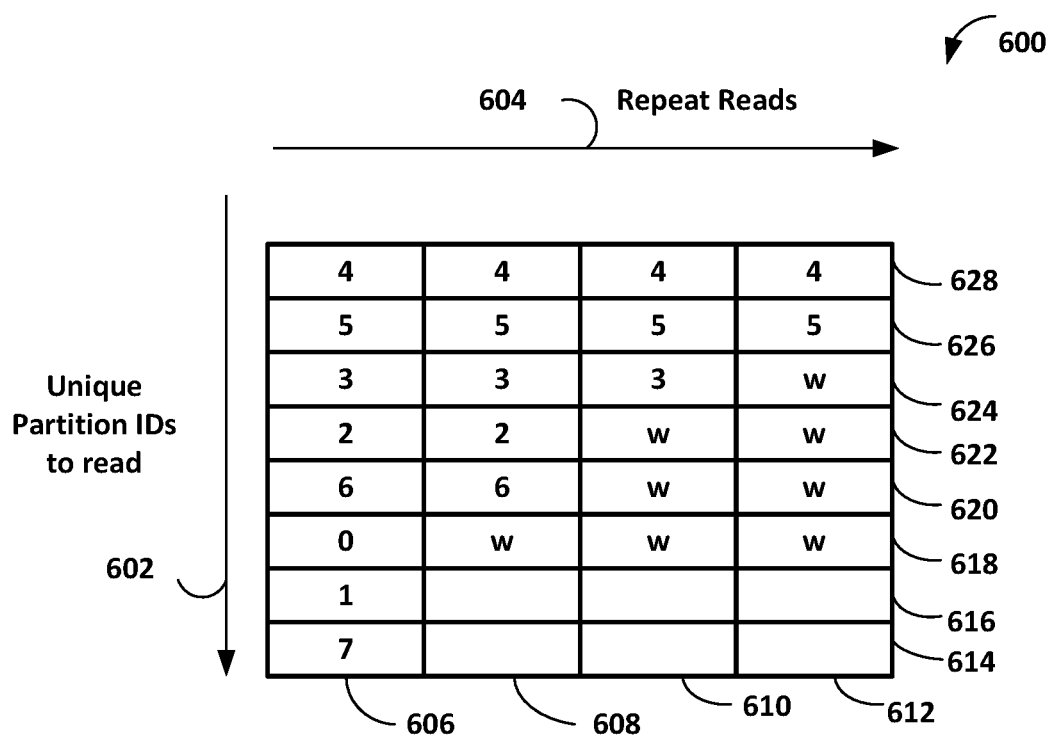
FIG. 6 is an example of a two-dimensional (2D) table of read operations that reduces the time to process the query shown in FIG. 5.

FIG. 6 is an example of a two-dimensional (2D) table of read operations 600 that reduces the time to process the query shown in FIG. 5. The 2D table of read operations 600 uses the Partition Busy Time between subsequent reads to the same partition to read other partitions. Each cell in the 2D table of read operations 600 shown in FIG. 6 represents a read operation, and the number in the cell represents the identifier of the partition to be read. The 2D table of read operations 600 shown in FIG. 6 has four columns 606, 608, 610, 612 and eight rows 614, 616, 618, 620, 622, 624, 626, 628.

The partitions to be read for the query are arranged in order of the number of reads to be performed to each partition. Partition identifiers 4 and 5 are read 4 times, partition identifier 3 is read 3 times, partition identifiers 2 and 6 are read 2 times and partition identifiers 0, 1 and 7 are read once.

Read operations are issued in order starting with the first read operation in column 606, row 628. Read operations are issued in the order shown in column 606 in direction 602. For column 606, a read operation is issued each cycle because the Partition Busy Time is less than the time taken to complete all the read operations in column 606.

After all of the read operations in column 606 have been completed, read operations are issued for the next column 608 in direction 604 and are issued in order in direction 602 starting with the read operation for partition identifier 4 in row 628. As there are fewer read operations in column 608 than in column 606, the Partition Busy Time is greater than the time taken to complete all the read operation in column 608, a wait cycle (W) is required (row 618) prior to starting the read operations at row 628 in column 610.

After all of the read operations in column 608 and the wait cycle have been completed, read operations are issued for the next column 610 in direction 604 and are issued in order in direction 602 starting with the read operation for partition identifier 4 in row 628. As there are fewer read operations in column 610 than in column 608, the Partition Busy Time is greater than the time taken to complete all the read operation in column 608, three wait cycles (W) are required in column 610 prior to reading partition ID 4 or 5 again.

After all of the read operations in column 610 and the three wait cycles (row 622, 620, 618) have been completed, read operations are issued for the next column 612 in direction 604 and are issued in order in direction 602 starting with the read operation for partition identifier 4 in row 628.

Figure 7:
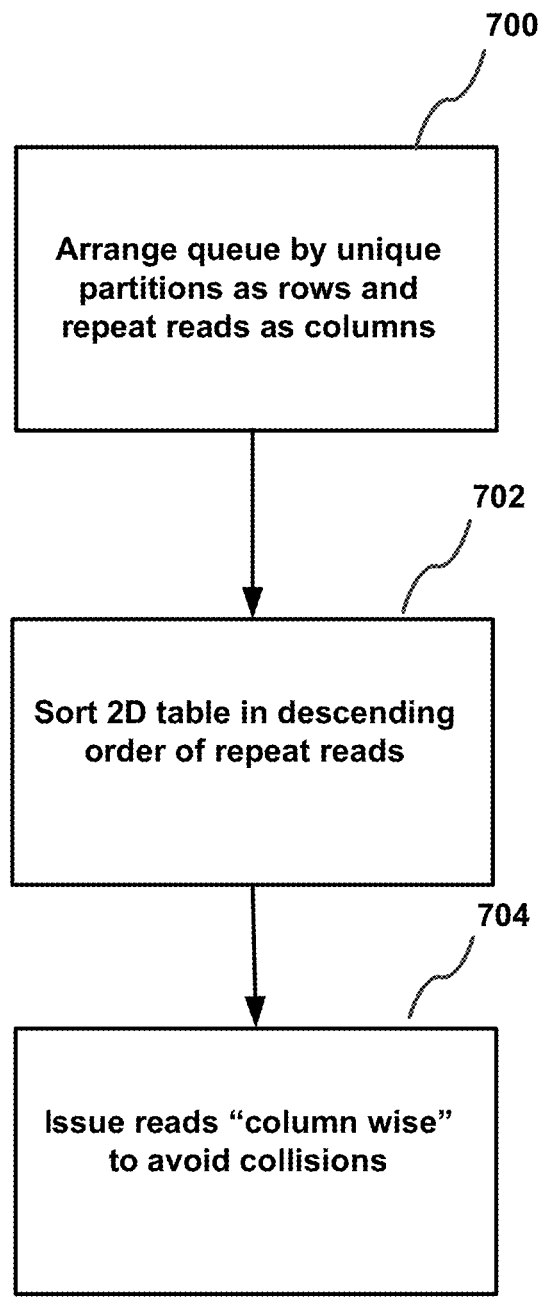
FIG. 7 is a flowgraph illustrating a method to schedule the read operations shown in FIG. 6 to avoid read collisions.

FIG. 7 is a flowgraph illustrating a method to schedule the read operations shown in FIG. 6 to avoid read collisions.

At block 700, the read queue is arranged by unique partition identifiers to read and repeat reads. The unique partition identifiers are arranged by rows and the repeat reads are arranged by columns (column 606, column 608, column 610, column 612).

At block 702, the 2D table of read operations 600 is sorted in descending order of repeat reads.

At block 704, the reads are issued "column-wise" as discussed in conjunction with FIG. 6 to avoid collisions. A collision is a read request to the same partition that results in wait cycles while the partition is busy.

Figure 8:
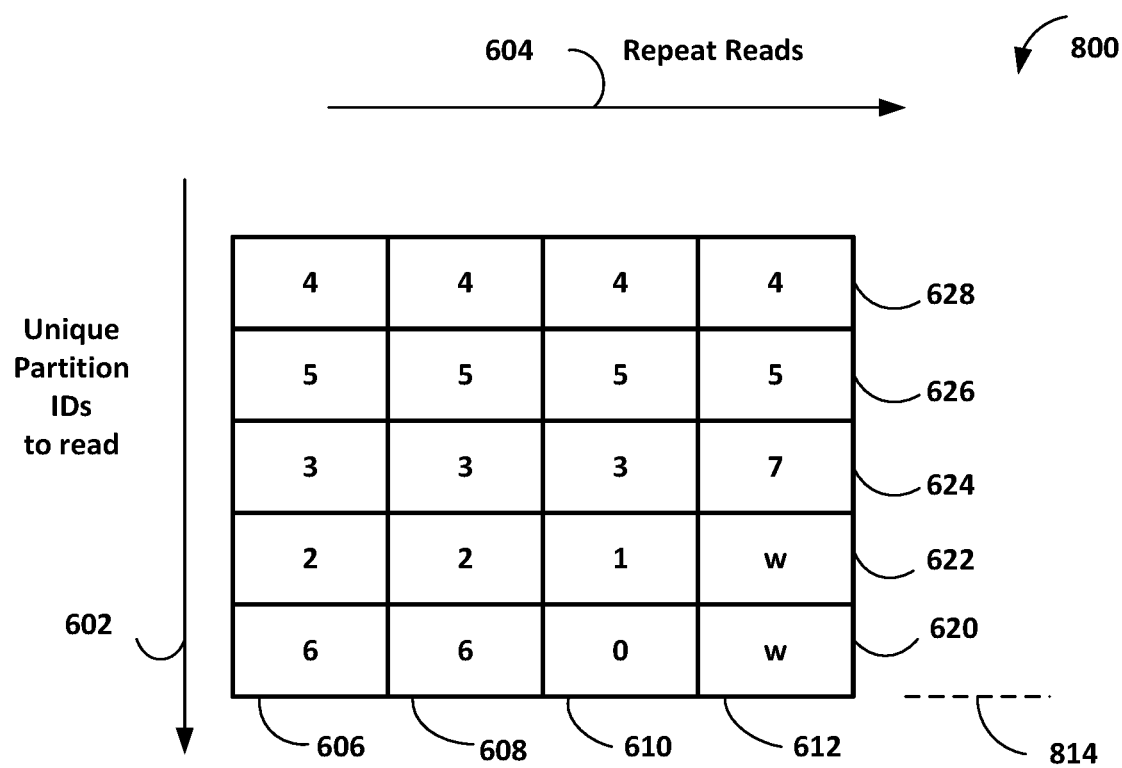
FIG. 8 is an example of an optimal two-dimensional (2D) table of read operations that reduces the time to process the query shown in FIG. 5.

FIG. 8 is an example of an optimal two-dimensional (2D) table of read operations 800 that reduces the time to process the query shown in FIG. 5. The read operations shown in FIG. 6 can be further optimized by using the wait cycles to read other partitions.

The dashed line 814 marks the point at which the Partition Busy Time is greater than the cycle time multiplied by the number of reads per column. Starting at the bottom row 614 of the 2D table of read operations 600 shown in FIG. 6, partition ID 7 is moved from the bottom row 614 of column 606 to the first wait cycle in row 624 in column 612. Partition ID 1 is moved from row 616 in column 606 to the first wait cycle in row 622 in column 610. Partition ID 0 is moved from row 618 in column 606 to the second wait cycle in row 620 in column 610.

The 2D table of read operations 800 can be read from top to bottom and left to right as described in conjunction with the 2D table of read operations 600 shown in FIG. 6 with each downward pass taking Partition Busy Time. Each downward pass takes exactly 1 Partition Busy Time such that the N partition reads can be completed in Partition Busy Time*N. The number of wait cycles is reduced from eight in the 2D table of read operations 600 shown in FIG. 6 to two in the 2D table of read operations 800 shown in FIG. 8 which results in a reduction of the read latency. The subsequent column-wise reads are performed to different partitions in the cross-point memory array 100 to reduce latency between subsequent column-wise reads to a partition in the cross-point memory array 100.

Figure 9:
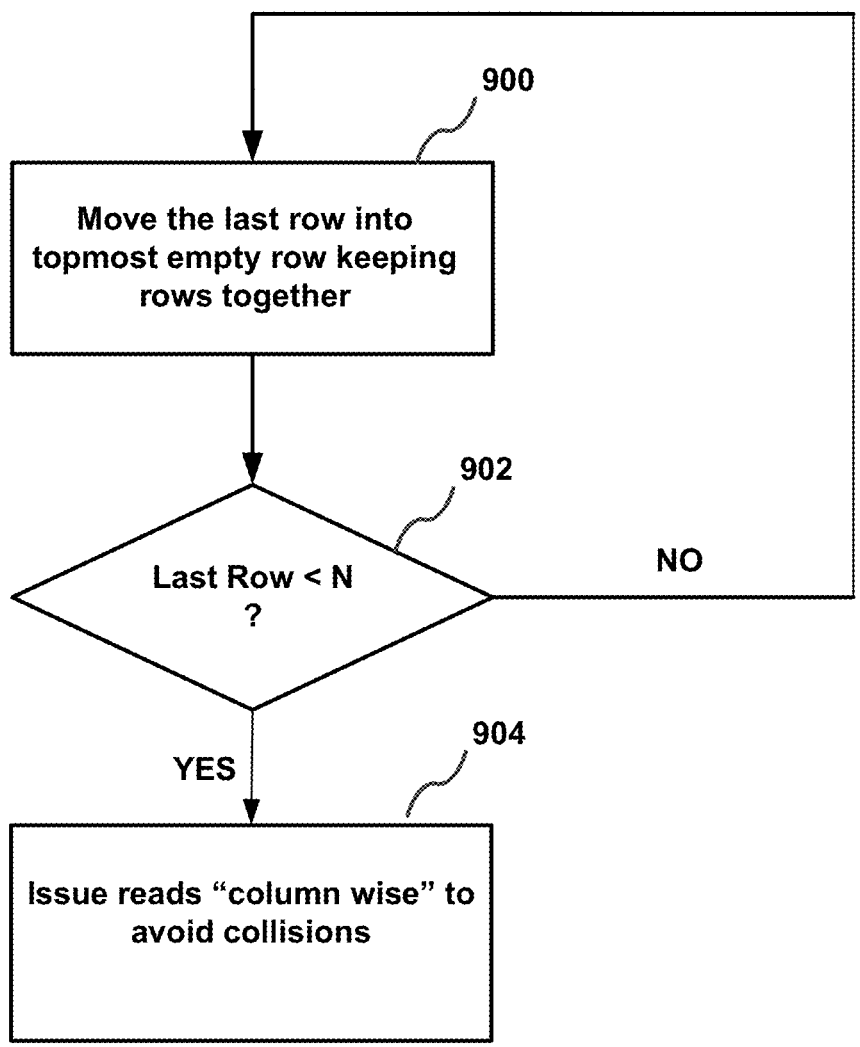
FIG. 9 is a flowgraph illustrating a method to optimize the scheduler by scheduling the read operations as shown in the 2D table of read operations in FIG. 8 to avoid read collisions.

FIG. 9 is a flowgraph illustrating a method to optimize the scheduler by scheduling the read operations as shown in the 2D table of read operations 800 in FIG. 8 to avoid read collisions. FIG. 9 will be discussed in conjunction with the 2D table of read operations 600 shown in FIG. 6 and the 2D table of read operations 800 shown in FIG. 8.

At block 900, the last row in the 2D table of read operations 600 is row 614. There is one read operation to partition ID 7 in row 614 and one wait cycle in the topmost empty row 624. The read operation to partition ID 7 in row 614 is moved to row 624.

At block 902, the last row is row 616 which is not less than N=upper limit where the upper limit is Partition Busy Time/cycle time. Processing continues with block 900.

At block 900, the last row in the 2D table of read operations 600 is row 616. There is one read operation to partition ID 1 in row 616 and two wait cycles in the topmost empty row 622. The read operation to partition ID 1 is moved to row 626.

At block 902, the last row is row 618 which is not less than N=upper limit where the upper limit is Partition Busy Time/Cycle Time. Processing continues with block 900.

At block 900, the last row in the 2D table of read operations 600 is row 618. There is one read operation to partition ID 0 in row 618 and two wait cycles in the topmost empty row 620. The read operation to partition ID 0 is moved to row 620.

At block 902, the last row is row 620 which is less than N=upper limit where the upper limit is Partition Busy Time/Cycle Time. Processing continues with block 904.

At block 904, the read operations in the 2D table of read operations 800 are issued "column-wise" to avoid collisions.

Figure 10:
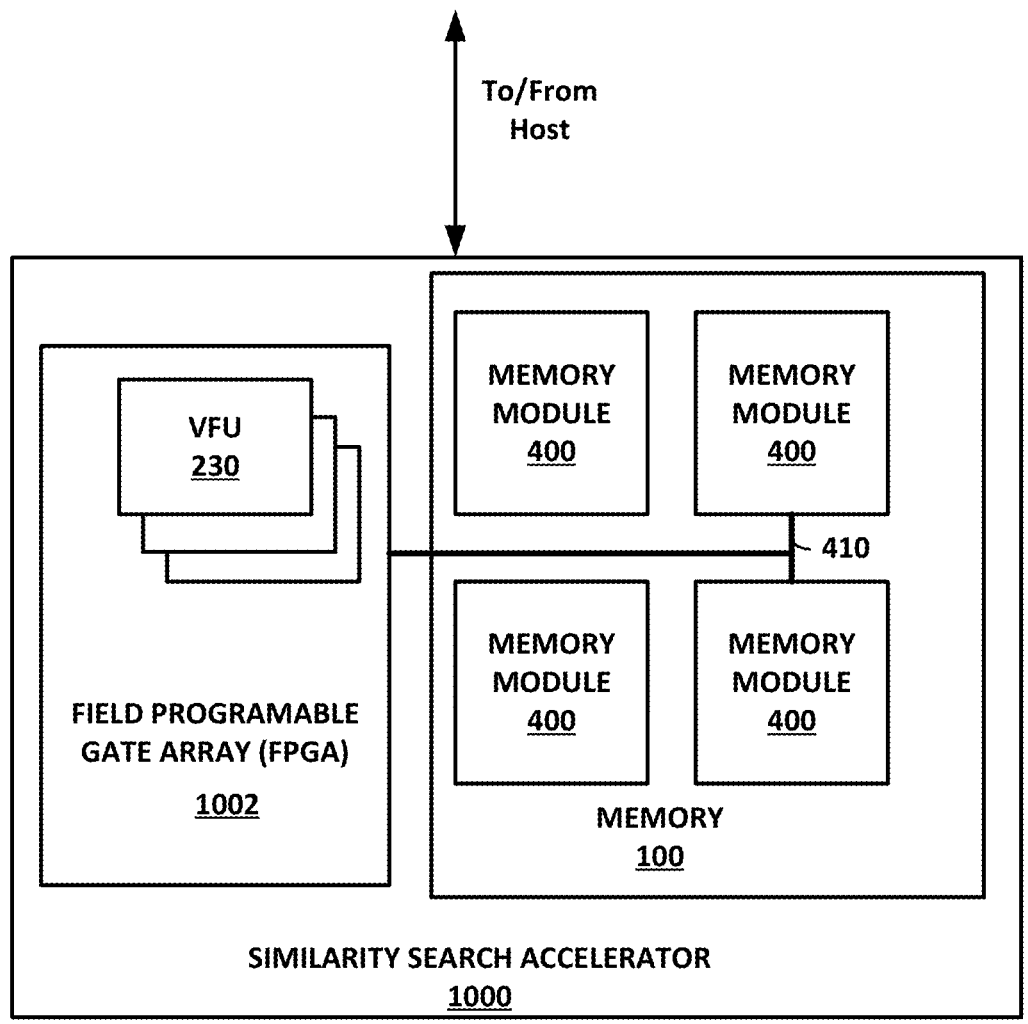
FIG. 10 is a block diagram of a similarity search accelerator.

FIG. 10 is a block diagram of a similarity search accelerator 1000. The similarity search accelerator 1000 includes one or more Vector Functional Units (VFU) 230 that can be included in a Field Programmable Gate Array (FPGA) 1002. The VFU 230 can perform vector-based operations in hardware. As discussed in conjunction with FIG. 2, the VFU 230 can rank and sort the top N matching rows (vectors) based on the number of set bits matching the column data that read from memory 100, and can send, to the processor 202, data indicative of the top N matching rows (vectors) as the search results.

Each VFU 230 is independent from other VFUs 230 and has its own set of control registers and results memory, for example, a volatile memory such as Static Random Access Memory (SRAM). Multiple VFUs 230 in the similarity search accelerator 1000 provide parallel operations between the VFUs 230. In the embodiment shown in FIG. 10, the similarity search accelerator 1000 is connected directly to a host (not shown). In other embodiments, the similarity search accelerator 1000 can be aggregated behind a local host to increase performance.

As discussed in conjunction with FIG. 4, the memory module 400 includes a plurality of the stochastic associative memory comprising a cross-point memory array 100 shown in FIG. 1. Each memory module 400 includes a plurality of column-addressable non-volatile memory dies to store the search dataset. Multiple dies of the cross point memory array 100 on the memory module 400 are connected to a shared command/address bus 410. The one or more VFUs 230 are coupled to a plurality of memory modules 400 via the shared command/address bus 410. As such, in operation, data stored in the cross point memory array 100 on the memory module 400 is read in parallel from all of the dies of the cross point memory array 100 connected to the shared command/address bus 410.

Latency and bandwidth enhancements in queries per second can be obtained by sharding and replicating the search dataset across multiple column-addressable non-volatile memory devices 100 in the memory modules 400. A database shard ("sharding") is a horizontal partition in a database. Sharding can also be referred to as horizontal scaling or horizontal partitioning. The search dataset is split across the memory modules 400. For example, in an embodiment in which there are two memory modules 400, half of the search dataset is stored in one memory module 400 and the other half of the search dataset is stored in the other memory module.

Figure 11:
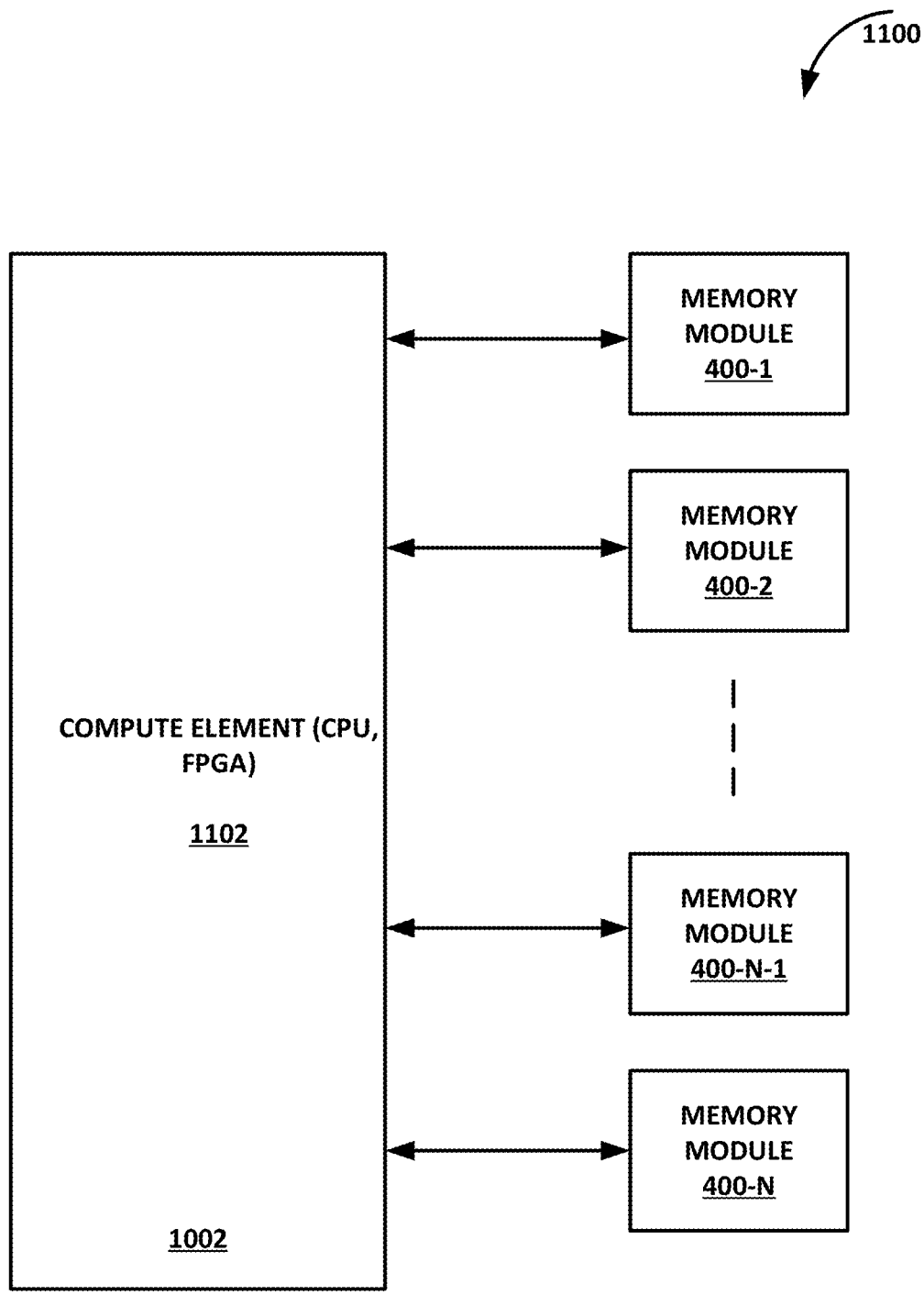
FIG. 11 is a block diagram of a similarity search accelerator including a compute element coupled to a plurality of memory modules.

FIG. 11 is a block diagram of a similarity search accelerator 1100 including a compute element 1102 coupled to a plurality of memory modules. In the embodiment shown in FIG. 11, there is one compute element 1102, which can be a CPU or an FPGA coupled to N memory modules 400-1, ..., 400-N.

The datasets can be split (sharded) across the N memory modules 400-1, ..., 400-N or the datasets can be copied across the N memory modules 400-1, ..., 400-N to reduce the time to perform the query in the N memory modules

400-1, . . . , 400-N. A host performs the scheduling and collating of the reads during query times.

In an embodiment, the compute element 1102 and the N memory modules 400-1, . . . , 400-N can be on the same printed circuit board. In another embodiment, the compute element 1102 and the N memory modules 400-1, . . . , 400-N can be in a distributed system with network links.

The number of memory modules 400-1, . . . , 400-N that can be connected to the compute element 1102 is limited by the number of memory channels available on the compute element 1102.

Figure 12:
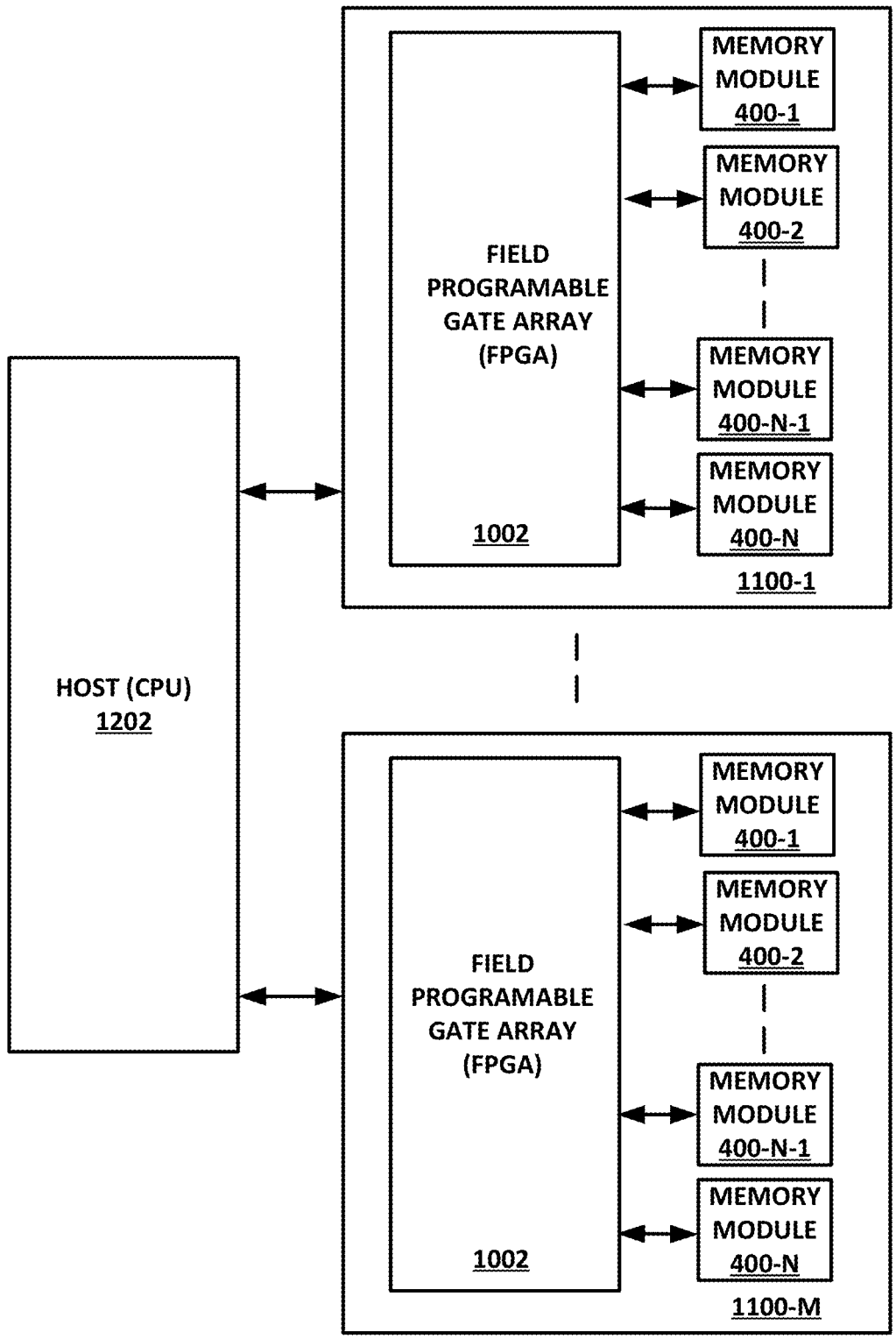
FIG. 12 is a block diagram of a plurality of the similarity search accelerators shown in FIG. 11 coupled to a host (CPU)

FIG. 12 is a block diagram of a plurality of the similarity search accelerators 1100 shown in FIG. 11 coupled to a host (CPU) 1202. The number of memory modules 400-1, . . . , 400-N is increased by connecting multiple similarity search accelerators 1100 to a host (CPU) 1202. In the embodiment shown there are N similarity search accelerators 1100-1, . . . 1100-M. Each of the similarity search accelerators 1100-1, . . . 1100-M has N memory modules 400-1, . . . , 400-N.

The host (CPU) 1202 partitions the reads to provide compute parallelism so that the memory modules 400-1, . . . , 400-N in the similarity search accelerators 1100-1, . . . 1100-M operate at maximum bandwidth.

The queries per second (QPS) performance/throughput is increased by replicating and/or sharding (splitting) the dataset amongst the plurality of memory modules 400-1, . . . , 400-N. In an embodiment in which the dataset is replicated, the performance scales proportionally, for example, P copies of the dataset provides P times improvement in throughput. The performance improvement is lower when the dataset is split (sharded) amongst the plurality of memory modules memory modules 400-1, . . . , 400-N, for example, P shards provides P/2 improvement in throughput because the throughput is limited by the slowest shard, and the number of reads to each shard are different.

Depending on the dataset size and the capacity of the memory modules 400-1, . . . , 400-N, the dataset can be split and replicated using a combination of sharding and replication. For example, a dataset can be replicated to provide 2 copies of the dataset and the two copies can be sharded (split) across multiple memory modules 400-1, . . . , 400-N. With multiple copies of the dataset that is shared across multiple memory modules 400-1, . . . , 400-N, multiple queries can be performed in parallel (which can also be referred to as batch processing).

Figure 13:
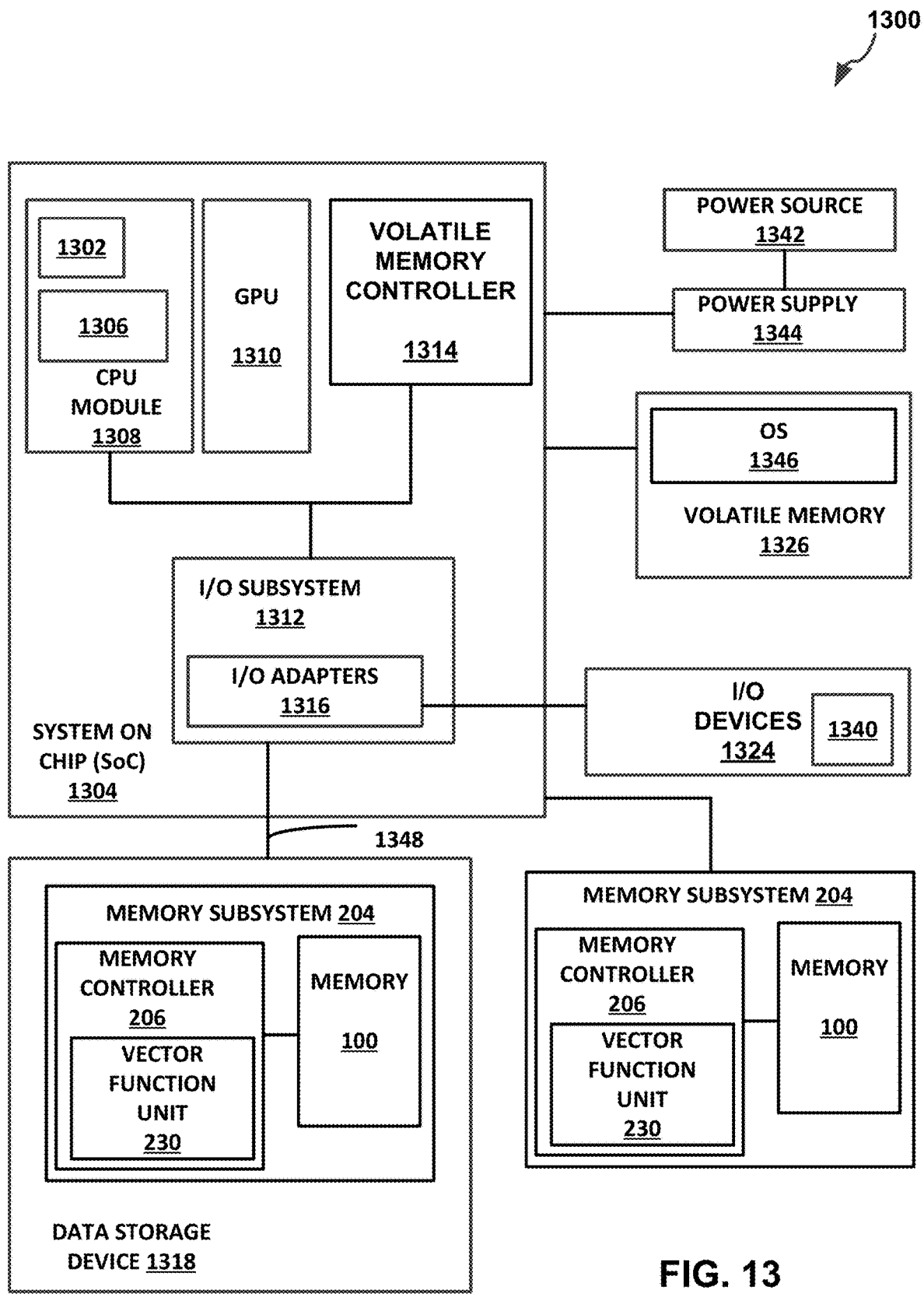
FIG. 13 is a block diagram of an embodiment of a computer system that includes the similarity search accelerator.

FIG. 13 is a block diagram of an embodiment of a computer system 1300 that includes memory subsystem 204. Computer system 1300 can correspond to a computing device including, but not limited to, a server, a workstation computer, a desktop computer, a laptop computer, and/or a tablet computer.

The computer system 1300 includes a system on chip (SOC or SoC) 1304 which combines processor, graphics, memory, and Input/Output (I/O) control logic into one SoC package. The SoC 1304 includes at least one Central Processing Unit (CPU) module 1308, a volatile memory controller 1314, and a Graphics Processor Unit (GPU) 1310. In other embodiments, the volatile memory controller 1314 can be external to the SoC 1304. The CPU module 1308 includes at least one processor core 1302 and a level 2 (L2) cache 1306.

Although not shown, each of the processor core(s) 1302 can internally include one or more instruction/data caches, execution units, prefetch buffers, instruction queues, branch address calculation units, instruction decoders, floating point units, retirement units, etc. The CPU module 1308 can correspond to a single core or a multi-core general purpose processor, such as those provided by Intel® Corporation, according to one embodiment.

The Graphics Processor Unit (GPU) 1310 can include one or more GPU cores and a GPU cache which can store graphics related data for the GPU core. The GPU core can internally include one or more execution units and one or more instruction and data caches. Additionally, the Graphics Processor Unit (GPU) 1310 can contain other graphics logic units that are not shown in FIG. 13, such as one or more vertex processing units, rasterization units, media processing units, and codecs.

Within the I/O subsystem 1312, one or more I/O adapter(s) 1316 are present to translate a host communication protocol utilized within the processor core(s) 1302 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 1316 can communicate with external I/O devices 1324 which can include, for example, user interface device(s) including a display and/or a touch-screen display 1340, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 1316 can also communicate with a solid-state drive ("SSD") 1318 which includes memory subsystem 204.

The I/O adapters 1316 can include a Peripheral Component Interconnect Express (PCIe) adapter that is communicatively coupled using the NVMe (NVM Express) over PCIe (Peripheral Component Interconnect Express) protocol over bus 1348 to the SSD 1318. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Volatile memory 1326 is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications. The JEDEC standards are available at www.jedec.org.

The memory subsystem 204 includes a byte-addressable, write-in-place memory that can be accessed by rows or columns, for example, Intel 3D XPoint™. Other examples of byte-addressable, write-in-place memory include, but are not limited to, single or multi-level Phase Change Memory (PCM) or phase change memory with a switch (PCMS), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other types of byte-addressable, write-in-place memory.

An operating system 1346 is software that manages computer hardware and software including memory allocation and access to I/O devices. Examples of operating systems include Microsoft® Windows®, Linux®, iOS® and Android®.

Power source 1342 provides power to the components of system 1300. More specifically, power source 1342 typically interfaces to one or multiple power supplies 1344 in system 1300 to provide power to the components of system 1300. In one example, power supply 1344 includes an AC to DC (alternating current to direct current) adapter to plug into a wall outlet. Such AC power can be renewable energy (e.g., solar power) power source 1342. In one example, power source 1342 includes a DC power source, such as an external AC to DC converter. In one example, power source 1342 or power supply 1344 includes wireless charging hardware to charge via proximity to a charging field. In one example, power source 1342 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
    a cross-point memory array having a plurality of rows and columns of memory cells to store a plurality of bit vectors across multiple partitions of the cross-point memory array, each partition of the multiple partitions having a unique partition identifier; and
    circuitry connected to the cross-point memory array, wherein the circuitry is to:
        receive a query to match a search key comprising a bit vector;
        perform block column-wise read requests of the cross-point memory array for columns of memory cells corresponding to set bits in the bit vector to obtain a plurality of vertical bit vectors;
        aggregate set bits in the plurality of vertical bit vectors on a row-wise basis to calculate similarity scores for a plurality of rows;
        arrange a subset of the plurality of rows having top N similarity scores in partition order by number of reads to be performed for a unique partition identifier of a partition in the cross-point memory array in which the plurality of rows are located, including to:
determine if the partition order in which subsequent column-wise reads are to be performed requires one or more wait cycles prior to performing a read to a same partition, wherein the subsequent column-wise reads are performed subsequent to the block column-wise read requests, and
change the partition order to use at least one of the one or more wait cycles to read another partition, further including to move one unique partition identifier to use a wait cycle for another unique partition identifier;
perform the subsequent column-wise reads in the partition order to avoid partition collisions and reduce read latency to read the plurality of rows having top N similarity scores; and
determine if any of the plurality of rows store data matching the search key.

2. The apparatus of claim 1, wherein the cross-point memory array includes a plurality of memory devices and the plurality of bit vectors stored across multiple partitions of the cross-point memory array includes bit vectors replicated in each of the plurality of memory devices.

3. The apparatus of claim 1, wherein the cross-point memory array includes a plurality of memory devices and the plurality of bit vectors stored across multiple partitions of the cross-point memory array includes bit vectors sharded across the plurality of memory devices.

4. The apparatus of claim 1, wherein the circuitry coupled to the cross-point memory array includes a vector function unit and the block column-wise read requests are performed by the vector function unit.

5. The apparatus of claim 1, wherein the cross-point memory array comprises stochastic associative memory that allows both row-wise reads and column-wise reads with similar read latency.

6. The apparatus of claim 1, wherein the cross-point memory array comprises a three dimensional cross-point memory.

7. A system comprising:
a processor;
a cross-point memory array having a plurality of rows and columns of memory cells to store a plurality of bit vectors across multiple partitions of the cross-point memory array, each partition of the multiple partitions having a unique partition identifier; and
circuitry connected to the cross-point memory array and operatively connected to the processor, wherein the system is configured to:
receive a query to match a search key comprising a bit vector,
perform block column-wise read requests of the cross-point memory array for columns of memory cells corresponding to set bits in the bit vector to obtain a plurality of vertical bit vectors,
aggregate set bits in the plurality of vertical bit vectors on a row-wise basis to calculate similarity scores for a plurality of rows,
arrange a subset of the plurality of rows having top N similarity scores in partition order by number of reads to be performed for a unique partition identifier of a partition in the cross-point memory array in which the plurality of rows are located, including to determine if the partition order in which subsequent column-wise reads are to be performed requires one or more wait cycles prior to performing a read to a same partition, wherein the subsequent column-wise reads are performed subsequent to the block column-wise read requests, and to change the partition order to use at least one of the one or more wait cycles to read another partition, further including to move one unique partition identifier to use a wait cycle for another unique partition identifier,
perform the subsequent column-wise reads in the partition order to avoid partition collisions and reduce read latency to read the plurality of rows having top N similarity scores, and
determine if any of the plurality of rows store data matching the search key.

8. The system of claim 7, wherein the cross-point memory array includes a plurality of memory devices and the plurality of bit vectors stored across multiple partitions of the cross-point memory array includes bit vectors replicated in each of the plurality of memory devices.

9. The system of claim 7, wherein the cross-point memory array includes a plurality of memory devices and plurality of bit vectors stored across multiple partitions of the cross-point memory array includes bit vectors sharded across the plurality of memory devices.

10. The system of claim 7, wherein the cross-point memory array comprises stochastic associative memory that allows both row-wise reads and column-wise reads with similar read latency.

11. The system of claim 7, further comprising one or more of:
a display communicatively coupled to the processor; or
a battery coupled to the processor.

12. A method comprising:
receiving a query to match a search key comprising a bit vector;
performing block column-wise read requests of a cross-point memory array having a plurality of rows and columns of memory cells to store a plurality of bit vectors across multiple partitions of the cross-point memory array, each partition of the multiple partitions having a unique partition identifier, wherein the block column-wise read requests are for columns of memory cells corresponding to set bits in the bit vector to obtain a plurality of vertical bit vectors;
aggregating set bits in the plurality of vertical bit vectors on a row-wise basis to calculate similarity scores for a plurality of rows;
arranging a subset of the plurality of rows having top N similarity scores in partition order by number of reads to be performed for a unique partition identifier of a partition in the cross-point memory array in which the plurality of rows are located, including:
determining if the partition order in which subsequent column-wise reads are to be performed requires one or more wait cycles prior to performing a read to a same partition, wherein the subsequent column-wise reads are performed subsequent to the block column-wise read requests, and
changing the partition order to use at least one of the one or more wait cycles to read another partition, including moving one unique partition identifier to use a wait cycle for another unique partition identifier;
performing the subsequent column-wise reads in the partition order to avoid partition collisions and reduce read latency to read the plurality of rows having top N similarity scores; and determining if any of the plurality of rows store data matching the search key.

13. The method of claim 12, wherein the cross-point memory array includes a plurality of memory devices and the plurality of bit vectors stored across multiple partitions of the cross-point memory array includes bit vectors replicated in each of the plurality of memory devices.

14. The method of claim 12, wherein the cross-point memory array includes a plurality of memory devices and the plurality of bit vectors stored across multiple partitions of the cross-point memory array includes bit vectors sharded across the plurality of memory devices.

\* \* \* \* \*